Dec. 16, 1947.  J. M. SCHUCKERS  2,432,591
CLUTCH
Filed Sept. 23, 1943

INVENTOR.
John M. Schuckers
BY
ATTORNEYS

Patented Dec. 16, 1947

2,432,591

UNITED STATES PATENT OFFICE 2,432,591

CLUTCH

John M. Schuckers, Elmira, N. Y., assignor to The Hilliard Corporation, Elmira, N. Y., a corporation of New York Application September 23, 1943, Serial No. 503,480

9 Claims. (Cl. 192—104)

1

This invention relates to a structurally and functionally improved clutch and in its more specific aspects relates to a clutch structure in which a release between the driving and driven members will be effected as soon as the parts rotate at a speed in excess of that determined by the design of the clutch and in which the parts will not be coupled again until the driving unit has slowed down to a predetermined extent.

A further object of the invention is that of furnishing a structure of this type which will be fully automatic in operation, in which both the release and reengagement of the clutch parts will occur substantially instantaneously and in a positive manner.

Consequently, the clutch assembly will transmit full torque immediately prior to the release and disengagement of the clutch parts. Conversely, full load-carrying capacity will be re-established immediately upon the clutch parts being again engaged.

Another object of the invention is that of furnishing a unit of this character which will embody relatively few parts, each individually simple and rugged in construction, these parts being capable of ready assemblage to furnish a compact design of unit capable of operating over long periods of time with freedom from all difficulties.

With these and other objects in mind, reference is had to the attached sheet of drawings illustrating practical embodiments of the invention, and in which.

Figure 1:
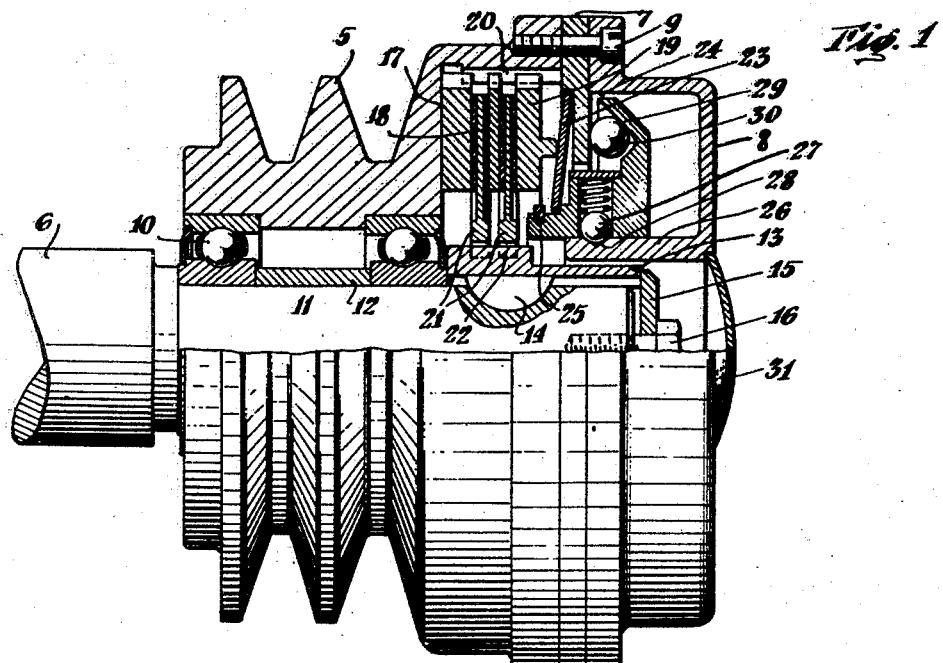
Fig. 1 is a partly sectional side view of a clutch assembly and with the parts thereof in engaged positions.

Primarily referring to Fig. 1, the numeral 5 indicates the driving member of the clutch and 6 the shaft to be driven. The driving member has been illustrated in the form of a sheave. Obviously, it might take any desired form and whereby driving torque might be transmitted to its body. Similarly, the shaft 6 has been shown as continuing to extend materially beyond the clutch assembly. While in most designs such a construction may follow, it is apparent that the driven member may again take any desired and acceptable form.

In any event, it is preferred that the driving member have secured to it a spring plate 7 and

2 a cover. These members may be coupled to the body 5 and against movement with respect to each other by means of bolts 9. Anti-friction bearings 10 may support the driving member 5 for rotation upon the reduced end portion 11 of the shaft and a spacer 12 may be disposed between these bearings.

A hub 13 is mounted against rotation with respect to the shaft 6 by, for example, a key 14. This hub is clamped in position by means of a retainer cap 15 and clamp screw 16. In order to couple the driving and driven portions of the clutch assembly, the housing portion of the sheave or its equivalent may enclose a filler plate 17, a center plate 18, and a pressure plate 19. These elements are retained against rotation with respect to the driving member by means of a sliding spline structure 20.

Hub plates 21 are mounted against rotation with respect to the hub 13 by means of a sliding spline structure indicated at 22. It will be obvious that the faces of the plates 17, 18 and 19 and/or the faces of the hub plates 21 may present desirable gripping surfaces by applying thereto layers of suitable material or metal or treating these faces—if necessary—in any desired manner to obtain a proper functioning of the apparatus.

In order to assure of a proper face-to-face engagement between the plates, a spring 23 is interposed between the pressure plates 7 and 19. This spring is preferably in the form of a steel disc which is "dished" and formed with an opening in its center to, in effect, provide a truncated cone. A spring of this type might be termed "disc spring," although it is sometimes known in engineering circles as a "Belleville" spring. This spring is engaged by an annular rib or projection extending from the face of the pressure plate 19. Its inner edge portion is engaged in a manner hereinafter brought out. However, it is obvious that with a spring of this type considerable resistance to separation of the plates will be offered and, therefore, the latter will normally rotate as a single unit.

In order to furnish a mechanism by means of which the clutch will be automatically operated, it will be observed that a collar 24 is disposed within the cover 8 and slidably rides over a tubular extension 26 thereof. An extension from collar 24 projects inwardly and in concentric relationship with the hub 13 to a point beyond the inner edge portion of the spring 23. At that point, the extension carries a snap ring 25 or other suitable element capable of engaging the inner edge portion of the spring 23. Detent members serve normally to maintain collar 24 in the position shown in Fig. 1. These members may include a suitable number of spring-projected balls 27 which bear within a groove 28 formed in the extension 26.

The operating collar 24 has its outer diameter in the form of a cone or incline 29. This face extends adjacent the corresponding face of the pressure plate 7. Within the space thus defined are a plurality of actuating balls 30 conveniently formed of steel. It follows that if the balls 30 or their equivalent are forced or moved in outward radial directions, a thrust will be transmitted to the collar 24 as a consequence of the surface 29 and this collar will tend to shift to the right as viewed in Fig. 1. If the force be sufficient, the resistance offered by detent members 27 will be overcome and the latter will move to inoperative positions.

Under normal conditions and with the parts assembled in the manner shown and described, the entrance of foreign material into the clutch assembly may be prevented by a cover 31. The driving member will rotate the shaft or its equivalent without any slippage occurring between these parts. This lack of slippage will, of course, be within the limits of the capacity for which the parts are designed. As the speed of rotation increases, centrifugal force increases on the annular series of actuating balls 30. Such force, however, does not have any operating result unless the speed of rotation increases beyond a predetermined point. When the speed of rotation does increase beyond such point, then the centrifugal force acting on the balls 30 causes them to shift collar 24 despite the restraining influence exerted by the detents 27, and the collar moves away from member 5. The restraining influence exerted by the detents obviously disappears as soon as a certain amount of initial movement of the operating collar away from member 5 occurs. As soon as this occurs, the static friction of the balls 30 against the parts adjacent the same becomes sliding friction and has a lower value. Consequently, the collar 24 moves at an accelerated pace away from the driving member 5. Thereupon, the snap ring 25 or its equivalent is caused to engage the spring 23 adjacent its inner edge.

It will be borne in mind that this spring is of the type which gives maximum pressure at low deflection and has a decreasing pressure curve as deflection increases until a minimum pressure is reached. This may be immediately in advance of the station at which the spring is completely flat. As the spring reaches such a position, a slight increase in resistance may occur. This, however, will have no effect on the operation of the clutch. In any event and as the collar 24 continues to move, the ring 25 or equivalent structure will begin deflecting the spring 23. Due to the fact that the resistance of this spring decreases as it moves toward a flat or flattened position, it is apparent that when the afore described movements of the parts occur, the spring will substantially instantaneously assume a position at which its face lies in substantial contact with the face of pressure disc 7. Thus, all pressure will be removed from the clutch discs and a release of the parts will be immediately effected.

In other words, once axial movement of the operating collar has started, it is not necessary to have a continuing increase in driving speed to make the clutch parts function. In other words, these parts will now move with greater freedom. This will be because the restraint theretofore exercised by the detent structure no longer exists. Also, the greater the distance the balls 29 move away from the axis of the unit, the greater will be the action of centrifugal force even with a constant speed of the device. Therefore, a fully automatic clutch mechanism is furnished that will disconnect the drive of a rotating machine when the speed of operation reaches a fixed value. Therefore, the assembly functions as an automatic overspeed release clutch that will protect a driven machine from being overspeeded and damaged. As will also be obvious, re-engagement of the clutch is also automatic because such re-engagement is assured merely by reducing the speed of the driving part to a point where the parts may be engaged.

Figure 2:
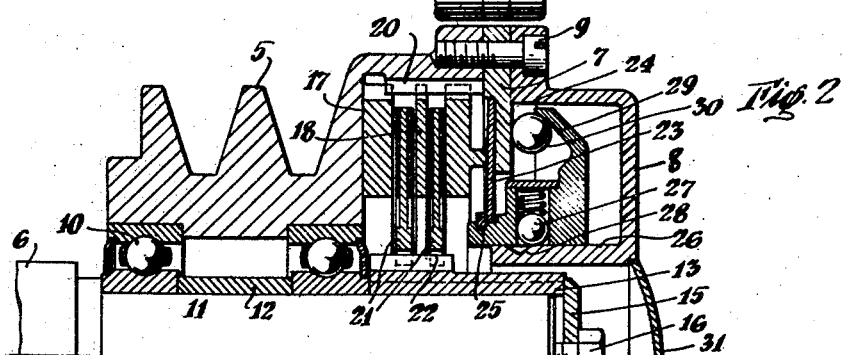
Fig. 2 is a sectional view showing the upper parts of the assembly as illustrated in Fig. 1 but with the parts in disengaged positions.

More particularly, as shown in Fig. 2, the parts have assumed the positions which they will occupy when the driving member is moving at too great a speed and the foregoing sequence of operation has resulted. In this view, it will be observed that the operating collar 24 is as far removed from the sheave 5 or other driving member as is possible consistent with the engagement of the snap ring 25 or its equivalent with the spring 23. Under these circumstances, the spring is held substantially flat against disc 7. As speed decreases and centrifugal force on actuating balls 30 diminishes, a point is reached where the pressure exerted by the spring urges the collar 24 towards the driving member. Once such movement is started, it will progress of its own accord without any further reduction of operating speed. This is because the actuating balls 30 are being drawn in towards the center of the clutch and the pressure exerted by spring 23 is increasing. This action will continue until that spring returns to the completely engaged position as shown in Fig. 1. At this point, the detent balls pass over the edge of the groove 28 and the action of the detent restores the collar 24 to its initial position.

Figure 3:
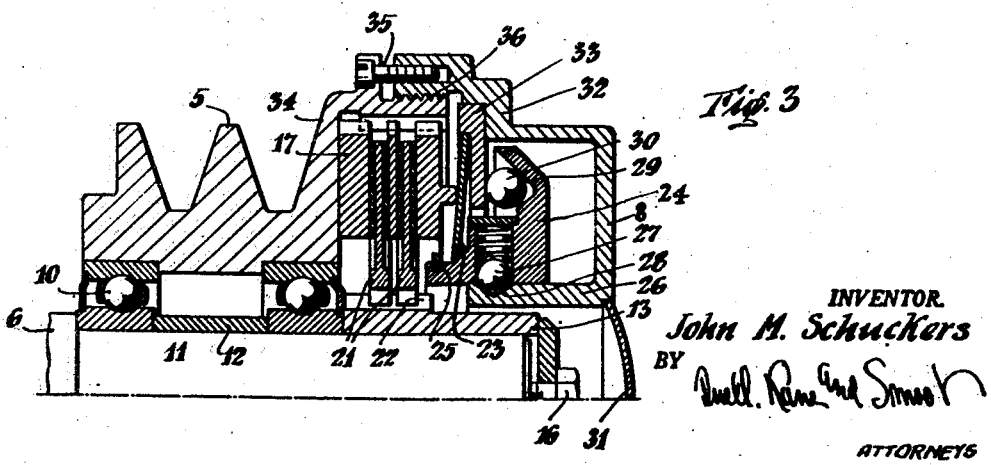
Fig. 3 is a similar view but showing a slightly modified form of construction which allows for an adjustment of the parts.

In the form of construction shown in Fig. 3, the cover 32 is extended to overlap and enclose the pressure disc 33. The driving member or sheave 34 extends within the cover member and screw threads 36 may be provided on the adjacent surfaces of these elements. Any desired number of lock screws 35 may also be furnished to prevent a relative rotation of the cover with respect to the driving member. Obviously, as a consequence of this construction, it is feasible to adjust the parts to compensate for wear on the part of the clutch plates; this being effected by simply rotating the parts 32 and 34 with respect to each other to draw them and the entire assembly into more intimate contact.

From the foregoing, it will be appreciated that, among others, the several objects of the invention as specifically aforenoted are achieved. Obviously, numerous changes in construction and rearrangements of the parts might be resorted to without departing from the spirit of the invention as defined by the claims.

I claim:

1. A clutch including a driving member, a driven member, plates associated with each of said members, a spring acting against said plates to normally assure an engagement of the same, said spring including a body offering diminishing resistance to compression; the normal position of such spring in said clutch being compressed to a small degree, operating means carried by said driving member and connectable with said body to further compress the spring to effect a disengagement of said plates, and means movable responsive to the action of centrifugal force to shift said operating means to connect it with said body.

2. A clutch including a driving member, a driven member, plates associated with each of said members, a spring acting against said plates to normally assure an engagement of the same, said spring including a body offering diminshing resistance to compression; the normal position of such spring in said clutch being compressed to a small degree, and means responsive to the action of centrifugal force and connected to said spring to further compress the same and assure a disengagement of said plates.

3. A clutch including a driving member, a driven member, plates associated with each of said members, a spring acting against said plates to normally assure an engagement of the same, said spring including a body offering diminishing resistance to compression; the normal position of such spring in said clutch being compressed to a small degree, means responsive to the action of centrifugal force and connected to said spring to further compress the same and assure a disengagement of said plates, and detent means preventing such compression of the spring until the amount of the centrifugal force has exceeded a predetermined value.

4. A clutch including in combination rotatably mounted driving and driven members presenting cooperative engageable surfaces, a spring, means connecting said spring with said members to normally—and with said spring expanded to a degree short of maximum expansion—assure an engagement of the surfaces thereof, said spring embracing the characteristic of offering decreasing resistance to compression, operating means carried by said driving member and connectable with said spring to further compress the same to effect a disengagement of said engageable surfaces and means also carried by said driving member and movable responsive to the action of centrifugal force to shift said operating means to connect it with said spring.

5. A clutch including in combination rotatably mounted driving and driven members presenting cooperative engageable surfaces, a spring, means connecting said spring with said members to normally—and with said spring expanded to a degree short of maximum expansion—assure an engagement of the surfaces thereof, said spring embracing the characteristic of offering decreasing resistance to compression, means to be acted upon by centrifugal force to move in directions outwardly of said members and whereby said latter means is increasingly subjected to such force, and connecting means extending between said latter means and spring to compress the same and release the member surfaces from operative engagement with each other.

6. A clutch including in combination rotatably mounted driving and driven members presenting cooperative engageable surfaces, a spring, means connecting said spring with said members to normally—and with said spring expanded to a degree short of maximum expansion—assure an engagement of the surfaces thereof, shiftable spring-compressing means, means carried by said driving member and responsive to the action of centrifugal force for operating said compressing means, and means whereby said compressing means is shifted to a material extent prior to operatively engaging said spring to compress the latter and release the member surfaces from operative engagement with each other.

7. A clutch including in combination rotatably mounted driving and driven members presenting cooperative engageable surfaces, a spring, means connecting said spring with said members to normally—and with said spring expanded to a degree short of maximum expansion—assure an engagement of the surfaces thereof, shiftable spring-compressing means, means for operating said compressing means, means whereby said compressing means is shifted to a material extent prior to operatively engaging said spring to compress the latter and release the member surfaces from operative engagement with each other, and detent means resisting shifting of said compressing means.

8. A clutch including in combination rotatably mounted driving and driven members presenting cooperative engageable surfaces, a spring, means connecting said spring with said members to normally—and with said spring expanded to a degree short of maximum expansion—assure an engagement of the surfaces thereof, shiftable spring-compressing means, means for operating said compressing means, means whereby said compressing means is shifted to a material extent prior to operatively engaging said spring to compress the latter and release the member surfaces from operative engagement with each other, detent means associated with said spring-compressing means, and means whereby said detent means is rendered operative to resist a shifting of said compressing means solely prior to the latter's operatively engaging with and compressing said spring.

9. A clutch including in combination rotatably mounted driving and driven plates presenting cooperative engageable surfaces, a disc spring having the characteristic of offering decreasing resistance to pressure and connected to said plates to normally assure an engagement of the surfaces thereof, a shiftable collar presenting a cam surface, means responsive to the action of centrifugal force and movable under the influence of such force into engagement with the cam surface to shift the collar, and means connected to said collar and engageable with said spring after said collar has moved a predetermined distance whereby said spring may be compressed to release the surfaces of said plates from operative engagement with each other.

JOHN M. SCHUCKERS.

REFERENCES CITED

The following references are of record in the file of this patent:

UNITED STATES PATENTS

| Number | Name | Date |
|---|---|---|
| 2,229,319 | Wesselhoff | Jan. 21, 1941 |
| 2,073,146 | Gardiner | Mar. 9, 1937 |
| 2,045,557 | Almen et al. | June 23, 1936 |
| 2,302,125 | Howell | Nov. 17, 1942 |
| 1,145,656 | Apple | July 6, 1915 |
| 2,056,050 | Harris | Sept. 29, 1936 |
| 1,105,408 | Dechamps | July 28, 1914 |
| 1,483,699 | Thompson | Feb. 12, 1924 |
| 1,979,077 | Pilaar | Oct. 30, 1934 |
| 1,766,227 | Russell | June 24, 1930 |